Jan. 12, 1932. J. G. LINDEMAN 1,840,402
ROAD VEHICLE SUPPORT
Filed Oct. 21, 1929 2 Sheets-Sheet 1
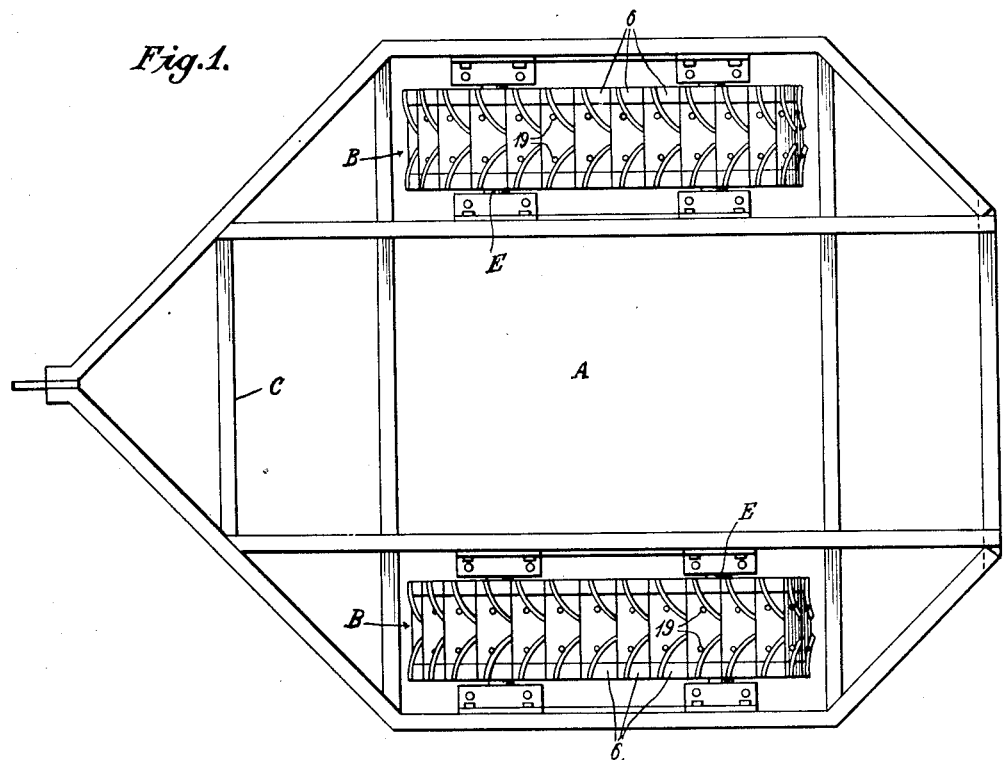
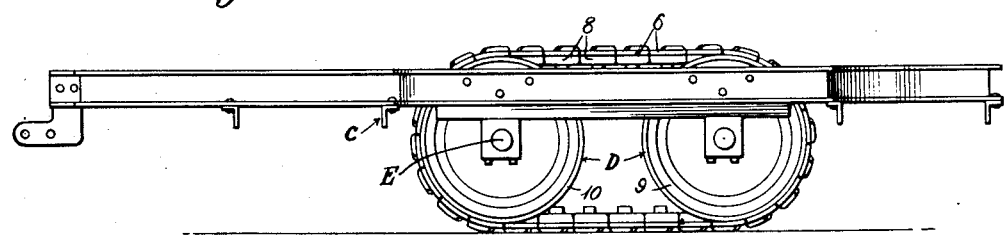
Inventor
J.G. Lindeman
By Bacon & Thomas
Attorneys Jan. 12, 1932.   J. G. LINDEMAN   1,840,402
ROAD VEHICLE SUPPORT
Filed Oct. 21, 1929   2 Sheets-Sheet 2
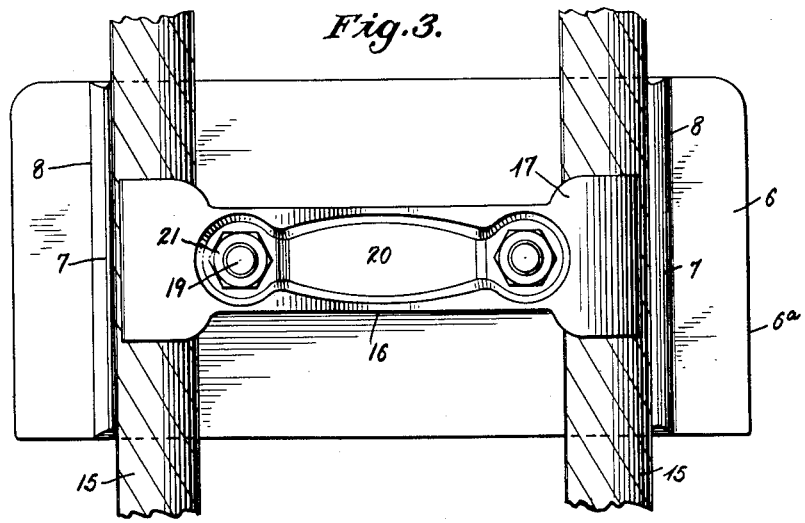
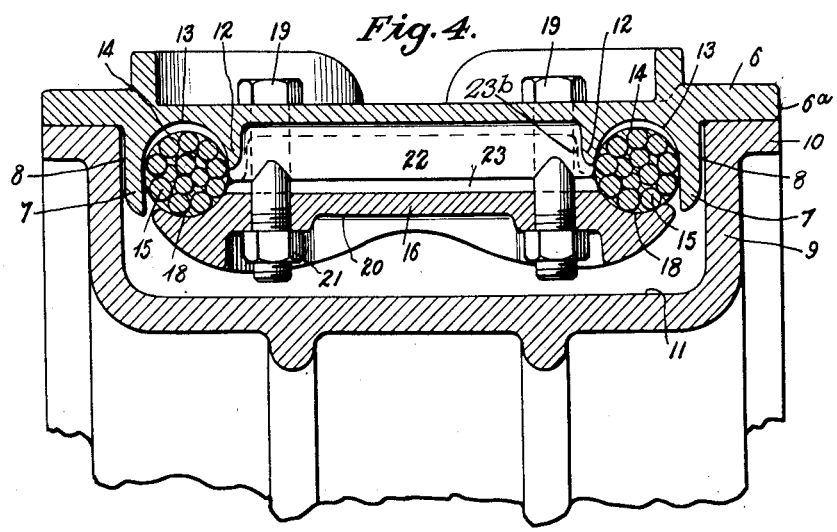
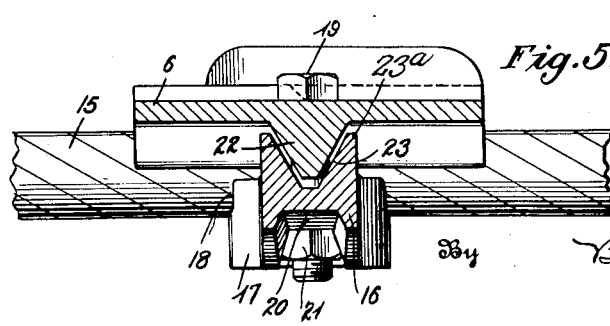
Inventor
J.G. Lindeman
By Bacon & Thomas
Attorneys Patented Jan. 12, 1932

1,840,402

UNITED STATES PATENT OFFICE

JESSE G. LINDEMAN, OF YAKIMA, WASHINGTON

ROAD VEHICLE SUPPORT

Application filed October 21, 1929. Serial No. 401,168.

This invention relates to new and useful improvements in road vehicle supports and deals more particularly with crawler track structures.

The primary object of the invention is to provide a crawler track structure wherein all pivots, pins, bushings and other wearing parts are entirely eliminated.

A further important object of the invention is to provide a track structure of the above mentioned type which is of exceedingly simple construction and which may be manufactured at a very nominal cost.

A still further object of the invention is to provide a track structure which may be of the endless or non-endless type and in the endless type, it may be of any desired diameter or length.

Other objects and advantages of the invention will be apparent during the course of the following description.

In the accompanying drawings forming a part of this specification and in which like numerals are employed to designate like parts throughout the same, Fig. 1 is a top plan view of a land vehicle equipped with the improved form of crawler track embodying this inventon, Fig. 2 is a side elevational view of the vehicle and track structure illustrated in Fig. 1, Fig. 3 is a plan view of one of the links employed to make up the track structure embodying this invention, said link being illustrated as secured to connecting cables, or the like, Fig. 4 is a sectional view taken through the link illustrated in Fig. 3 and a portion of the periphery of a wheel of the type adapted to accommodate this track structure, and Fig. 5 is a transverse sectional view of one of the links embodying this invention.

In the drawings, wherein for the purpose of illustration is shown a preferred embodiment of this invention, the character A designates in its entirety a vehicle equipped with this improved crawler track. This vehicle is of the trailer type but it is to be understood that I do not intend to limit myself to the use of this track structure on trailers for it may be as readily adapted to tractors or any other form of land vehicle. The particular installation illustrated in Figs. 1 and 2 includes a pair of track structures B, the individual members of said pair being located in parallelism on opposite sides of the vehicle frame structure C. The tracks B are mounted in each instance upon a pair of radially alined grooved wheels D supported by suitable axle structures E.

Each crawler track structure includes a plurality of links each of which consists of a main body 6 which is of plate formation and preferably has its major axis extending transversely of an entire track structure. Each plate is formed with a pair of transversely extending flanges 7 which are spaced inwardly from the opposite ends 6a of the plate body to form right angles 8, as best illustrated in Fig. 4. These right angle formations, produced by the flanges 7 and the laterally projecting end portions of the plate 6 are adapted to accommodate the side flanges 9 and peripheral flanges 10 of the grooved periphery 11 of each wheel structure D. The flanges 7 prevent the track structure from riding laterally off of the wheels.

Spaced longitudinally inwardly of each flange 7 is a flange 12 which cooperates with its adjacent flange 7 to produce a transverse groove 13. The bottom of each groove is formed with one or more transversely extending ribs 14 which may be roughened on its free edge if desired. This groove structure 13 is intended to receive a cable or chain 15 and the rib or ribs 14 are intended to bite into said connecting member 15 for preventing slippage between the link and the said member.

For the purpose of positively attaching the various links to the two securing members 15, which may take the form of cables or chains, each link is provided with a longitudinally extending clamping bar 16. Each end of this clamping bar is laterally enlarged, as at 17, and is formed with an arcuate depression 18 on its inner face to receive the cable or chain 15. For the purpose of tightly drawing the clamping bar 16 toward the inner face of the plate 6, a pair of bolts 19 are passed through apertures in said plate and registering apertures in the clamping bars 16. The exposed face of the clamping bar is depressed or shaped to form a recess 20, the opposite ends of which receive the nuts 21 threaded upon the ends of the bolts 19.

For the purpose of preventing lateral movement of the clamping bar 16 with respect to the plate 6, the said plate has formed longitudinally thereon a rib 22 which is of V-shape in cross section and extends between the inner cable clamping flanges 12. Figs. 4 and 5 clearly illustrate the bolts 19 as extending through the opposite end portions of this rib 22. The bar 16 is formed with a groove 23 which also is of V-shape in cross section and fits over the rib 22.

By inspecting Figs. 4 and 5 it will be seen that the groove 23 in the clamping bar 16 forms two flanges 23a which terminate at their opposite ends in abutments 23b adapted to be arranged substantially in engagement with the inner sides of the flanges 12 when the bar is drawn in place against the main body 6. This relationship between the flanges 23b and 12 prevents undesired longitudinal movement of the bar 16 relative to the body 6.

It will be understood that an endless crawler track may be formed by coupling two cables or chains 15 and clamping to these members any desired number of links. The links are positioned side by side upon the cables 15 with the latter received within the grooves 13 formed by the flanges 7 and 12. Each link then may be rigidly secured in place by passing bolts 19 through the apertures formed in the body of each plate and positioning a clamping bar 16 upon the said bolts. The drawing down of the nuts 21 will cause the arcuate end portions 18 of the bar 16 to force the cable or chain 15 into grooves 13, against the ribs 14 for rigidly connecting a link to the cables. With a pair of properly aligned wheels D suitably supported on each side of a vehicle, and with a track of the type above described associated with the grooved peripheries of the aligned wheels, a very efficient and practical form of support is produced.

It will be noted that this form of track link eliminates the necessity of employing hinges, pivots, pins, bushings and all other relatively movable wearing parts and thereby greatly simplifies the structure and increases the life of the same.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, what I claim is:

1. In a device of the type described, a plate-like body portion, a flange projecting from one face of the plate in spaced relation to the edge thereof for providing an angle between said face and the flange, a second flange spaced from the first flange and carried by said body portion, a rib extending at right angles to said second flange, a bolt passing through the plate and the rib, a clamping member having an end bridging the space between said flanges, and overlying said rib in interfitting engagement therewith, and means for retaining the clamping member upon said bolt.

2. In a device of the type described, a plate-like body portion, a pair of spaced flanges connected to the body portion and located at each end thereof, a rib extending longitudinally of the body portion between said pairs of flanges, a clamping bar having a longitudinally extending groove to receive said rib and having enlarged end portions to bridge the spaces between the flanges of each pair, and means for securing the clamping bar to said plate.

3. In a device of the type described, a plate-like body portion having a pair of spaced grooves traversing the same, a rib extending longitudinally of the body portion between said grooves, a clamping bar having a longitudinally extending groove to receive the rib and having its end positioned to close said spaced grooves, and means for drawing the bar toward the body portion.

4. In a device of the type described, a body portion, a rib projecting from one face of the body portion, cable receiving means on said body portion beyond each end of said rib and extending at right angles thereto, a clamping bar having a groove to receive said rib, cable receiving means on said bar beyond each end of said groove, and means for drawing the bar toward the body portion including elements passing through said rib and groove.

5. In a device of the type described, a plate-like body portion, two spaced flanges of unequal heights connected to the body portion to form a groove, a rib extending at right angles to the flanges, a clamping bar traversing the shorter flange and the groove and having spaced flanges forming a groove to receive the said rib, the ends of the flanges on the said bar abutting the shorter flange on said body, and means for drawing the bar toward the body.

6. In a device of the type described, a plate-like body portion, two pairs of spaced flanges connected in spaced relation to the body portion, each pair consisting of flanges of unequal heights spaced to form grooves, a rib extending at right angles to the flanges and between the shorter ones of said pairs of flanges, a clamping bar traversing the shorter flanges and the grooves and having spaced flanges forming a groove to receive the said rib, the ends of the flanges on said bar abutting the shorter flanges on said body, and means for drawing the bar toward the body portion.

In testimony whereof I affix my signature.

JESSE G. LINDEMAN.